United States Patent [19]

Ogaki

[11] Patent Number: 5,019,923
[45] Date of Patent: May 28, 1991

[54] SYSTEM FOR DISCRIMINATING TAPE SPEED MODE

[75] Inventor: Hiroshi Ogaki, Shibuya, Japan

[73] Assignee: Victor Company of Japan, Ltd., Yokohama, Japan

[21] Appl. No.: 491,086

[22] Filed: Mar. 9, 1990

[30] Foreign Application Priority Data

Mar. 10, 1989 [JP] Japan .................................. 1-58685

[51] Int. Cl.[5] ........................................... G11B 15/467
[52] U.S. Cl. ..................................................... 360/73.07
[58] Field of Search ..................................... 360/73.07

[56] References Cited

U.S. PATENT DOCUMENTS

| 4,338,640 | 7/1982 | Yabu et al. | 360/73.07 |
| 4,594,618 | 6/1986 | Kozuki et al. | 360/73.07 |
| 4,618,899 | 10/1986 | Doutsubo | 360/73.07 |
| 4,663,673 | 5/1987 | Doutsubo | 360/73.07 |

Primary Examiner—Robert S. Tupper
Attorney, Agent, or Firm—Fleit, Jacobson, Cohn, Price, Holman & Stern

[57] ABSTRACT

There is disclosed an improvement of a system for discriminating a tape speed mode of a recorded tape on which control pulses are recorded in the tape speed mode, so that a spacing of the control pulses represents the tape speed mode. The system comprises a reel element for winding the recorded tape and transporting the recorded tape at a varying speed; a head element for detecting the control pulses and producing detected pulses when the recorded tape is transported by the reel element rotating at a rotation rate; a counting circuit for counting the detected pulses at a rate of the rotation rate of the reel element and producing a counted value; and a determining circuit for determining the tape speed mode from the counted value by comparing the counted value with a threshold value and outputting a determined result as the tape speed mode.

6 Claims, 4 Drawing Sheets

SYSTEM FOR DISCRIMINATING TAPE SPEED MODE

BACKGROUND OF THE INVENTION

The present invention relates to an improvement of a system for discriminating a tape speed mode used for recording such as a standard play (SP) or an extended play (EP) mode, when recorded data are reproduced from a data-decorded tape such as a video tape.

A video tape recording/reproducing equipment (called VTR hereinunder) has the SP mode and EP mode as a recording or reproducing tape speed mode for the video tape in the VHS type standard (VHS is the trade name initials for Video Home System). The SP mode means a standard mode of the VHS standards, which is a tape running speed mode for recording and reproducing data for two hours together to and from a video tape of the type T-120, while the EP (extended play) mode for six hours together is three times as long as the SP mode.

The tape speed mode is discriminated by control pulse signals (a series of pulses of predetermined spacings) which are recorded on the tape and control a tape running speed at reproduction. For example, the control pulse signals are recorded at the rate of 30 pulses per 3.3 centimeters (cm) of tape in the SP mode, while there are 30 pulses per 1.1 cm in the EP mode, i.e., three times shorter in the pulse spacing.

There is disclosed an example of a conventional system for discriminating the tape speed mode in FIG. 1. In the figure, a video tape 1 moves from a supply reel 2 side to a take-up reel 3 side driven by a capstan motor shaft 4 and a pinch roller 5. A detection head 6 is provided for detecting control pulses recorded along the tape 1.

A detection circuit 7 is connected to the motor shaft 4 for detecting a rotation rate of a capstan motor. A detected signal of the circuit 7 is sent to a discriminating circuit 8 for discriminating the tape speed mode of the video tape together with a detected signal of the head 6.

Next, operation is described in the conventional system having the aforementioned configuration. The tape 1 is depressed to the motor shaft 4 by the pinch roller 5. The tape 1 is running from the side of the supply reel 2 to the side of the take-up reel 3 with the rotation of the shaft 4.

The head 6 detects when the tape is running by control pulses which are prerecorded on the tape 1, thereby sending the detected signals to the discriminating circuit 8. On the other hand, the circuit 7 detects a rotation signal representing a rotation rate of the shaft 4 of the capstan motor, thereby sending the signal to the discriminating circuit 8.

Next, the discriminating circuit 8 calculates a proportion of the motor rotation signal to the control pulses, thereby discriminating the tape speed mode of the tape 1 on the basis of the proportion.

However, the conventional system needs to make the tape 1 run in the condition of being engaged with the shaft 4 depressed by the pinch roller 5 in order to detect the rotation signals of the capstan motor.

Accordingly, the conventional system has a problem that it is impossible to discriminate the tape speed mode of the tape in the case when the tape is not engaged with the tape to the motor shaft, for instance, in the condition of fast forward, rewinding, reel search or the like.

SUMMARY OF THE INVENTION

In the view of the aforementioned problem, an object of the present invention is to provide a system for discriminating a tape speed mode of a data recorded tape, which is capable of excellently discriminating the tape speed mode without attaching the tape to a shaft of a capstan motor by a pinch roller.

In order to achieve the above object, the system for discriminating the tape speed mode of the tape according to the present invention by a detection of control pulses, comprises a reel element for winding the recorded tape and transporting the recorded tape at a varying speed; a head element for detecting the control pulses and for producing detected pulses when the recorded tape is transported by the reel element rotating at a rotation rate; a counting circuit for counting the detected pulses at a rate of the rotation rate of the reel element and for producing a counted value; and a discriminating circuit for discriminating the tape speed mode from the counted value by comparing the counted value with a threshold value and for outputting a determined result as the tape speed mode.

As the present invention has the above construction, the head element detects the rotation rate of the reel element. The discriminating circuit calculates control pulses per a predetermined unit of the tape on the basis of the rotation ratios and control pulses detected by the head element, and compares the detected pulses with the threshold value, thereby discriminating the tape speed mode of the tape on the basis of the compared result.

As described above, the present invention has an effect capable of excellently discriminating the tape speed mode of the tape without pressing the tape to a shaft of a capstan motor by a pinch roller.

DETAILED DESCRIPTION OF THE PREFERRED EMBODIMENTS

Figure 1:
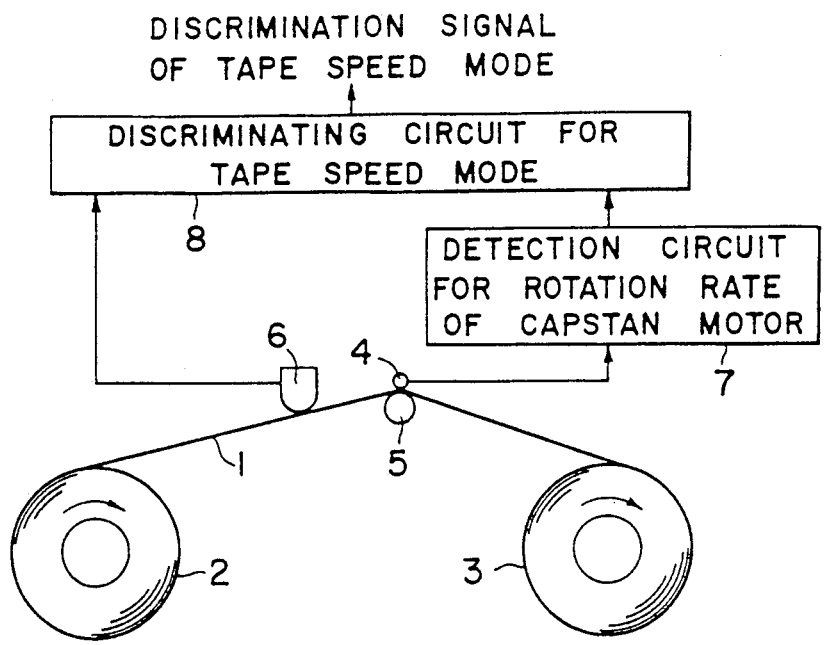
FIG. 1 is a block diagram showing a functional construction of a conventional system for discriminating a tape speed mode of a tape.

There will be described in detail hereinafter preferred embodiments of the present invention. Components which are indicated by the same numerals as the conventional system, are shown by the same numerals as FIG. 1, and the corresponding description of them is eliminated.

Figure 2:
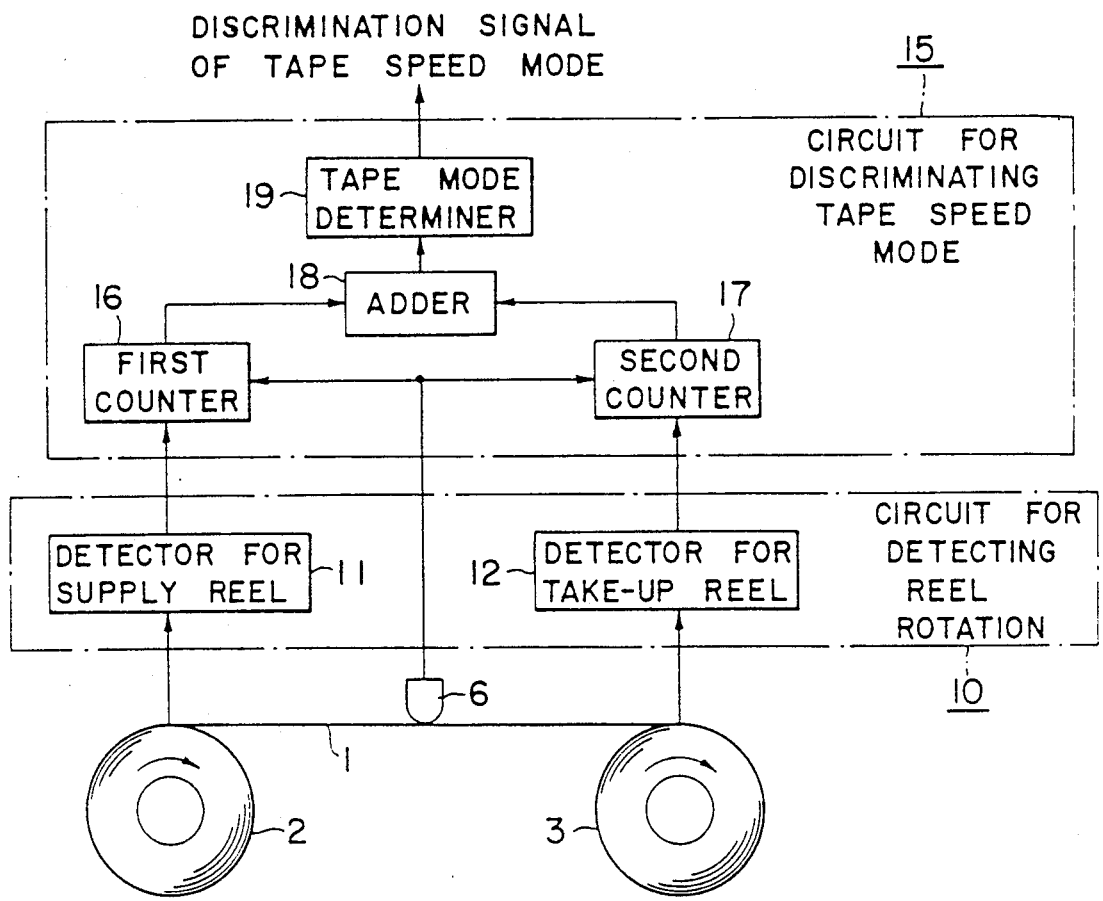
FIG. 2 is a block diagram showing a system for discriminating a tape speed mode of a tape according to a first embodiment of the present invention.

In FIG. 2 showing a first embodiment of the present invention, a system for discriminating a tape speed mode schematically comprises a circuit 10 for detecting rotation ratios of the tape supply reel 2 and the tape take-up reel 3, respectively, and a circuit 15 for discriminating the tape speed mode of a video tape 1.

The detecting circuit 10 comprises a detector 11 for detecting rotations of the supply reel 2 and producing a first rotation signal, and a detector 12 for detecting rotations of the take-up reel 3 and producing a second rotation signal. Each of the reel 2 and 3 is provided with a frequency generator of same pulse generating rate, so that a predetermined number of pulses are generated per complete turn of each reel. Accordingly, the reels 2 and 3 produce respectively first and second rotation signals, of which a number of pulses are constant when either of the reels makes one complete turn regardless of their rotational speeds.

The discriminating circuit 15 comprises a first counter 16 for counting the control pulses from the detecting head 6 in relation to the first rotation signal from the detector 11 for one complete turn of the supply reel 2, a second counter 17 for counting the control pulses from the detecting head 6 in relation to the second rotation signal from the detector 12 for one complete turn of the take-up reel 3, an adder 18 for adding outputs of the first and second counters 16 and 17 each other, so as to generate an added value, and a tape speed mode determiner 19 for determining a tape speed mode of the tape 1 by comparing the added value from the adder 18 with predetermined threshold values so as to output a discrimination signal of the tape speed mode for the data recorded tape 1.

Figure 3:
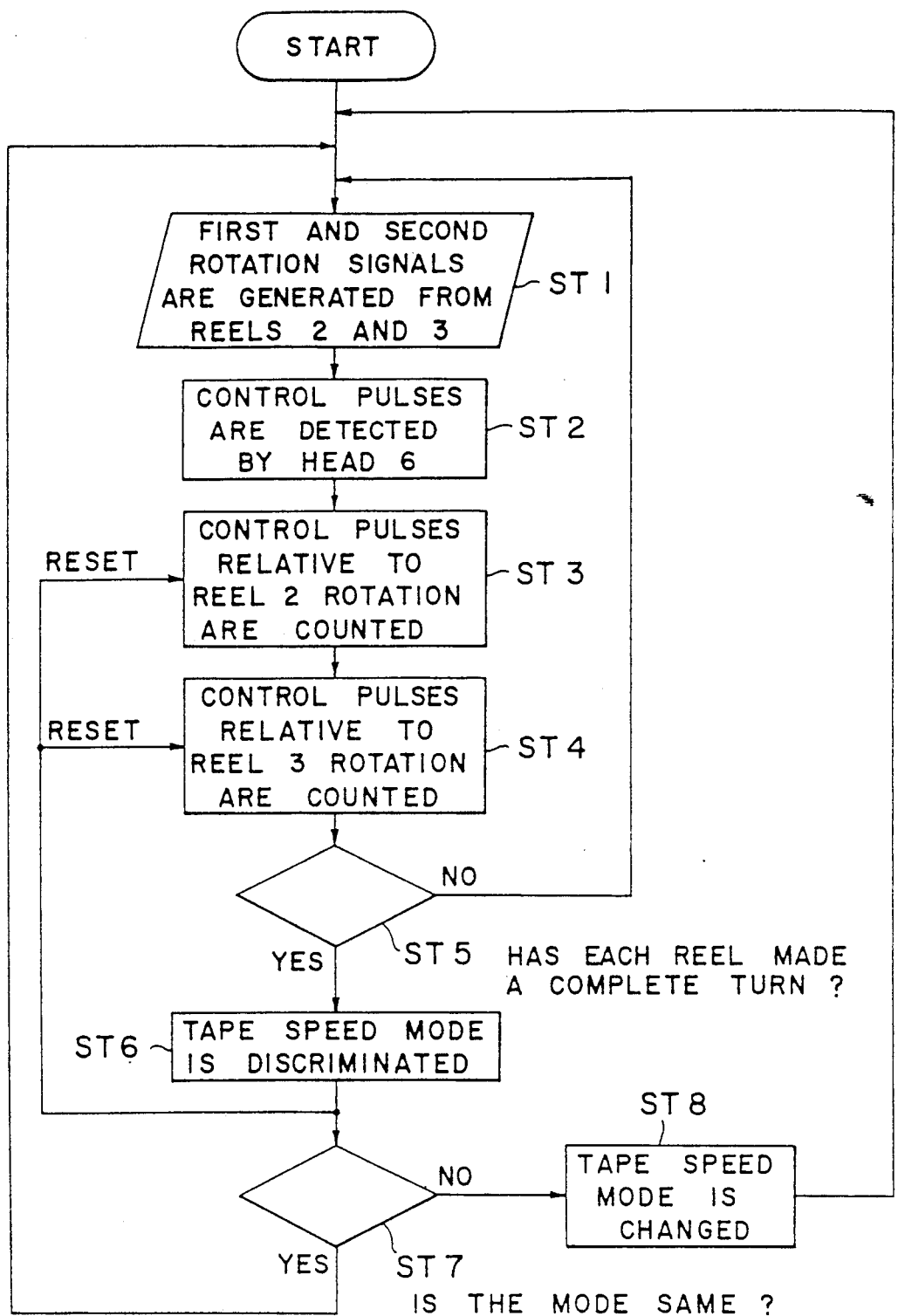
FIG. 3 is a flow chart for explaining the operation of the discrimination system according to the first embodiment of the present invention.

Referring to a flow chart shown in FIG. 3, there is described the function of the system according to the first embodiment of the present invention. In the first embodiment, a pinch roller 5 does not require to engage the tape 1, while the system performs operation in the mode of a fast forward, rewind and reel search in which a desired port of the recorded program is searched while the tape is transported solely by the two reels, or the like. Note that the tape speed in these modes is not uniformd.

At first, the first and second rotation signals of the supply reel 2 and take-up reel 3 are generated and supplied to the counters 16 and 17, respectively (refer to step ST1 in FIG. 3). On the other hand, the detecting head 6 detects the control pulses and supplies them to the counters 16 and 17 (refer to step ST2).

Next, the counter 16 counts a number of control pulses in relation to the first rotation signal corresponding to one complete turn of the supply reel 2 and outputs a number of a counted result (refer to steps ST3 and ST5). The counter 17 counts a number of control pulses in relation to the second rotation signal corresponding to one complete turn of the take-up reel 3 and outputs the number of a counted result (refer to steps ST4 and ST5).

Both counted results are supplied from the counters 16 and 17 to the adder 18 and are added together. The added value is supplied to the determiner 19 to determine the tape speed mode of recording (refer to step ST6). Namely, the determiner 19 compares the added value with a threshold value which is predetermined according to the two tape speed modes so as to discriminate one of the two possible tape speed modes, SP or EP, which is used for the actual recording of the tape as a comparison result.

As will be described in detail, the sum of diameters of the wound tapes around the reels 2 and 3 is constant. that is, the sum of circumferences of the wound tapes around the reels 2 and 3 is constant in spite of the winding amount of the tape. On the other hand, the counted result of the counter 16 is a number of control pulses per a predetermined rotational unit (one complete turn for example) of the supply reel 2, while the counted result of the counter 17 is that of the take-up reel 3. Accordingly, the sum of both counted results by the adder 18 represents a number of control pulses corresponding to the whole length of both circumferences added of the reels 2 and 3.

As described above, the control pulse signals are recorded at the rate of 30 pulses per 3.3 cm in the SP mode, while per 1.1 cm in the EP mode Therefore, the number of control pulses per whole length of both circumferences of he wound tapes of both reels 2 and 3 is different from each other between the two modes.

Figure 4:
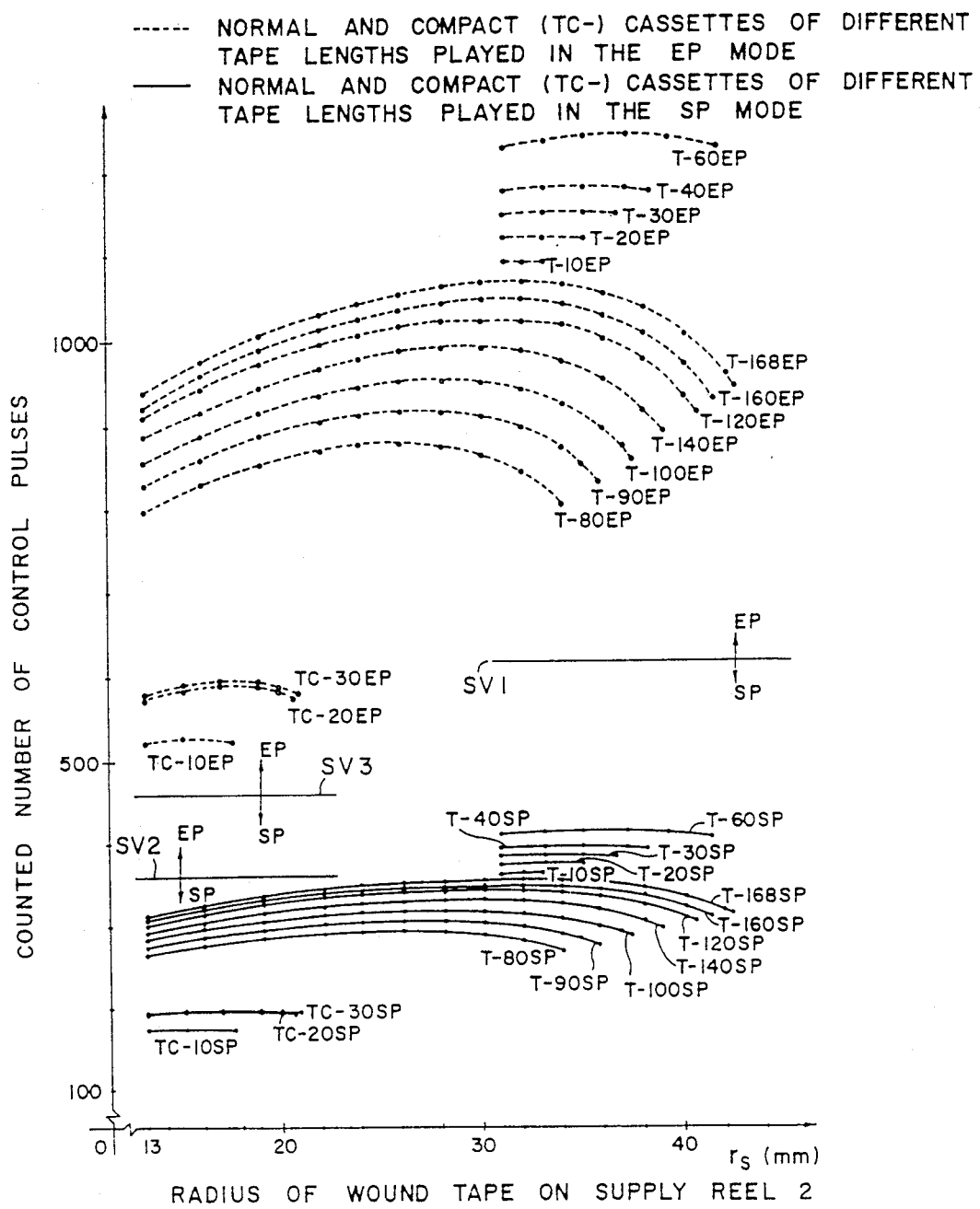
FIG. 4 is a characteristic diagram showing several examples of a threshold value used in the discrimination system of the first embodiment.

FIG. 4 shows the counted numbers of control pulses corresponding to the radius of the wound tape on the supply reel 2, which corresponds to the circumference of the wound tape. This relationship applies also to the reel 3. In the figure, "T" denotes the normal size cassette, and "TC−" denotes the compact size cassette. The number after "T" or "TC−" indicates a housed tape length denoted by its nominal playing time when played in the SP mode. Characters SP or EP after the number indicate the playback mode of which these calculated results (curves) are obtained. The symbols SV1, SV2 and SV3 are threshold values corresponding to respective sizes of the video tape cassettes. As can be clearly understood from the figure, the system of the present invention is capable of discriminating the tape speed mode of the recorded tape by comparing the added value of the adder 18 with the threshold value of such as the value SV3. The determiner 19 performs this processing to output the determination for the reproduction mode of the tape.

In order to play the loaded cassette tape at the determined speed, the system checks (at step ST7) whether the equipment (not shown) is conditioned to play in the SP mode or EP mode. If the equipment is already conditioned for the determined speed, operation returns to step ST1, if not, the system switches the condition of the equipment to another (SP to EP or EP to SP) mode (step ST8) and then returns to step ST1 so that the cassette tape being played is constantly monitored by the system of its recorded tape speed mode which may change part to part of the full length of the tape housed in the loaded cassette tape.

The system according to the first embodiment has several features based on the above construction as follows:

(1) As it is possible to discriminate the tape speed mode of the recorded tape in the condition of previously mentioned reel search mode when the pinch roller or capstan motor shaft is disengaged from the tape, the system facilitates the suitable selection of video heads and reel servo system designs;

(2) During the fast forward or rewinding of the tape also with the pinch roller being disengaged from the tape, it is possible to discriminate the tape speed mode of the recorded tape. For this reason, the switch from one tape speed mode to another tape speed for an already loaded tape can smoothly be carried out with a quick servo response through the manipulation processes such as: PLAY (in the S1 mode)→STOP→FAST FORWARD→REWIND→PLAY (in the EP mode);

(3) The determination of the tape speed mode is quickly performed even when the tape runs very briefly.

The present invention is not limited in the first embodiment, but may be changed in various plans to have the same functions and effects as this embodiment.

Figure 5:
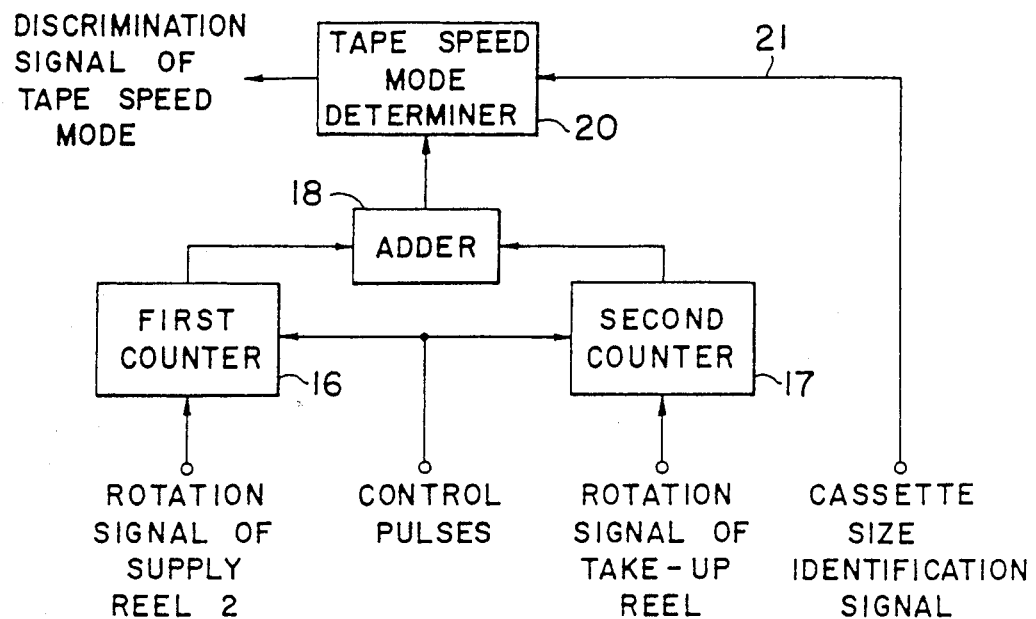
FIG. 5 is a block diagram showing a discrimination system according to a second embodiment of the present invention.

For example, a second embodiment is shown in FIG. 5. In the second embodiment of the figure, the size of the cassette (normal or compact) loaded to the video tape recording/reproducing equipment of the present invention, is identified by other known means provided to the equipment, and a size identification signal is produced accordingly. And the size identification signal is supplied to the determiner 20 through a signal line 21, thereby properly setting the threshold value to SVI in case of a normal size cassette, and to SV2 for a compact size cassette.

Figure 6:
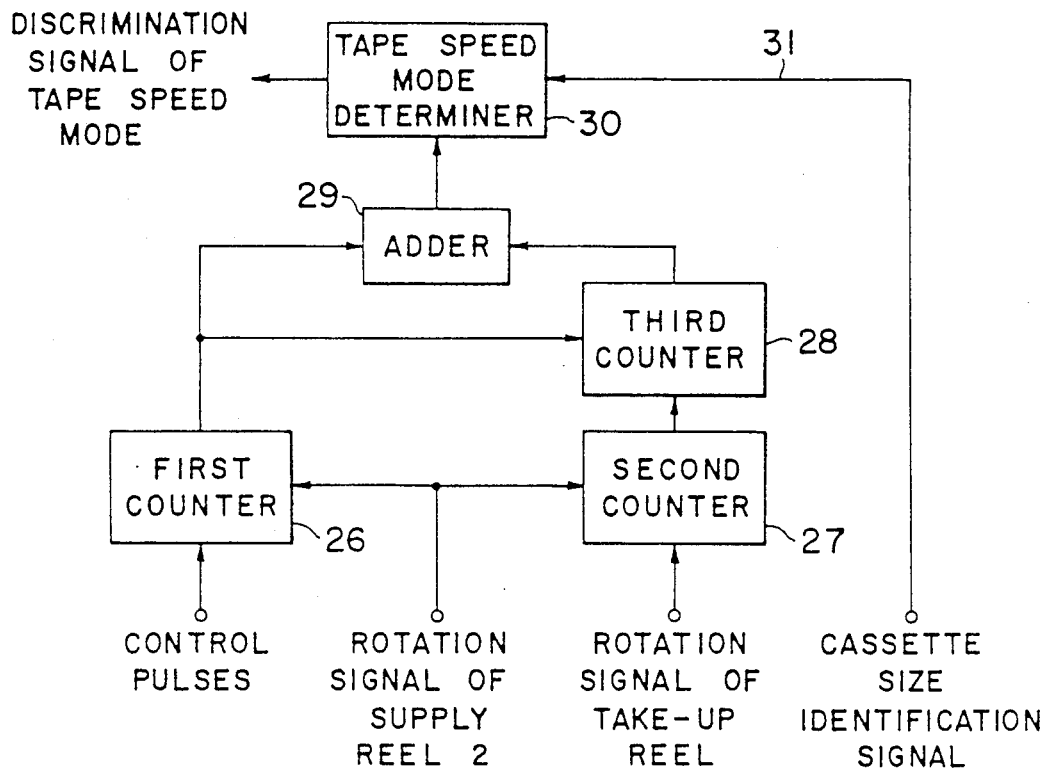
FIG. 6 is a block diagram showing a discrimination system according to a third embodiment of the present invention.

In FIG. 6 showing a third embodiment, a system comprises a first counter 26 to which control pulses and a rotation signal of the reel 2 are supplied, a second counter 27 to which the rotation signal of the supply reel 2 and a rotation signal of the take-up reel 3 are supplied, a third counter 28 to which the counted results of the first and second counters 26 and 27 are supplied, an adder 29 for adding the counted results of the first and third counters 26 and 28, and a tape mode determiner 30 for determining the tape speed mode of the recorded tape by comparing an added value with a threshold value such as SVI, SV2 or SV3 depending on the cassette size idetification signal supplied through a signal line 31.

Next, there is described the operation of the third embodiment having the above construction. The first counter 26 counts a number of the control pulses per a predetermined unit rotation (which may be one complete turn) of the supply reel 2, while the second counter 27 calculates a proportion of the wound tape diameters on the supply and take-up reels 2 and 3 from the input rotation signals of the reels 2 and 3. The counted pulses by the first counter and the proportion of the diameters are supplied to the third counter 28.

The third counter 28 calculates a number of control pulses per unit rotation of the take-up reel 3 on the basis of the number of pulses per the predetermined unit rotation of the supply reel 2 counted by the counter 26 and the proportion of the wound tape radii output from the counter 27. The calculated result from the counter 28 is supplied to the adder 29.

The adder 29 adds and outputs each other, from the first and third counters 26 and 28 and calculates the number of the control pulses corresponding to total circumferences of the wound tape respectively wound around the reels 2 and 3, and forward the calculated result to the determiner 30. The determiner 30 discriminates the tape speed mode of the recorded tape on the basis of the number of the control pulses per the total circumferences (which is approximately constant) and the threshold value determined accordingly with the cassette size identification signal supplied through the signal line 31.

In this third embodiment, the same result would be obtained when the rotation signals from the reels 2 and 3 are interchanged with each other with respect to the first and the second counters 26 and 27.

Furthermore, although the third embodiment shows a calculation circuit arrangement exclusive for discriminating the tape speed mode of the recorded tape, a microcomputer may perform the same functions by using a predetermined software.

What is claimed is:

1. A system for discriminating a tape speed mode of a recorded tape on which control pulses are recorded in the tape speed mode, thereby a spacing of the control pulses represents the tape speed mode, said system comprising reel means for winding the recorded tape and transporting the recorded tape at a varying speed;

head means for detecting said control pulses and producing detected pulses when the recorded tape is transported by the reel means rotating at a rotation rate;

means for counting said detected pulses at a rate of said rotation rate of said reel means and producing a counted value; and means for determining said tape speed mode from said counted value by comparing the counted value with a threshold value and outputting a determined result as the tape speed mode.

2. A system according to claim 1, wherein said reel means comprises a supply reel and a take-up reel for transporting the recorded tape therebetween;

said head means is disposed to contact a portion of the recorded tape extended between the supply and take-up reels; and said counting means comprises a first detector for producing a first rotation signal corresponding to a revolving rate of the supply reel, and a second detector for producing a second rotation signal corresponding to a revolving rate of the take-up reel, so that said rotation rate is represented by said first and second rotation signals, said counting means produces the counted value from the first and second rotation signals and from the detected pulses detected by said head means.

3. A system according to claim 2, wherein said counting means further comprises a first counter for counting a number of the detected pulses at a rate of the first rotation signal of said supply reel;

a second counter for counting a number of the detected pulses at a rate of the second rotation signal of said take-up reel; and an adder for adding said numbers of pulses each other, which are respectively counted by said first and second counters and for forwarding an added value to said determining means as the counted value.

4. A system according to claim 1, wherein said determining means comprises terminal means for receiving a cassette size identification signal and said threshold value is changed according to the cassette size identification signal input thereto.

5. A system according to claim 2, wherein said counting means further comprises a first counter for calculating a number of detected pulses at a rate of the first rotation signal of said supply reel;

a second counter for calculating a proportion of wound tape diameters respectively on said supply reel and said take-up reel from said first and second rotation signals;

a third counter for calculating a number of the detected pulses per unit rotation of said take-up reel from the number of the detected signals counted by said first counter and from said proportion calculated by said second counter; and an adder for adding said numbers of the detected pulses each other, which are respectively calculated by said first and third counters and for forwarding an added value to said determining a the counted value.

6. A device according to claim 5, wherein said determining means comprises terminal means for receiving a cassette size identification signal and said threshold value is changed according to the cassette size identification signal input thereto.

* * * * *